US012706886B2

(12) United States Patent
Jiang et al.

(10) Patent No.: US 12,706,886 B2
(45) Date of Patent: Aug. 11, 2026

(54) DATA DEPENDENT PREFERRED REGION FOR NOISE GENERATION

(71) Applicants: Lemon Inc., Grand Cayman (KY); Beijing Zitiao Network Technology Co., Ltd., Beijing (CN)

(72) Inventors: Bo Jiang, Culver City, CA (US); Wanrong Zhang, Culver City, CA (US); Donghang Lu, Culver City, CA (US); Jian Du, Culver City, CA (US); Sagar Sharma, Culver City, CA (US); Qiang Yan, Beijing (CN)

( * ) Notice: Subject to any disclaimer, the term of this patent is extended or adjusted under 35 U.S.C. 154(b) by 86 days.

(21) Appl. No.: 18/953,509

(22) Filed: Nov. 20, 2024

(65) Prior Publication Data

US 2026/0142949 A1 May 21, 2026

(51) Int. Cl.
*H04L 9/00* (2022.01)
*H04L 9/40* (2022.01)

(52) U.S. Cl.
CPC ................................ *H04L 63/0421* (2013.01)

(58) Field of Classification Search
CPC .................................................. H04L 63/0421
See application file for complete search history.

(56) References Cited

U.S. PATENT DOCUMENTS 12,314,418 B2 * 5/2025 Damewood ......... G06F 21/6245
2022/0277097 A1 * 9/2022 Cabot .................. H04W 12/02
2026/0003996 A1 * 1/2026 Cesar ................. G06F 16/2282

OTHER PUBLICATIONS

Jain, Prateek, and Abhradeep Thakurta. “Differentially private learning with kernels.” International conference on machine learning. PMLR, 2013. (Year: 2013).*

Soria-Comas, Jordi, and Josep Domingo-Ferrer. “Optimal data-independent noise for differential privacy.” Information Sciences 250 (2013): 200-214. (Year: 2013).*

[No. Author Listed], “Learning with privacy at scale,” Apple, Dec. 2017, 25 pages.

Awan et al., “Log-concave and multivariate canonical noise distributions for differential privacy,” Advances in Neural Information Processing Systems, Jun. 2022, 35:34 229-34 240.

(Continued)

*Primary Examiner* — Syed M Ahsan
(74) *Attorney, Agent, or Firm* — Fish & Richardson P.C.

(57) ABSTRACT

Methods, systems, and apparatus, including computer programs encoded on computer storage media, for using a preferred region that is query data dependent. One of the methods includes computing a preferred region for true query answers for a kernel differentially private mechanism using a noise value for a query for the kernel differentially private mechanism, a true query answer for a query for the kernel differentially private mechanism, and a relative error ratio for the preferred region; computing, for a kernel differentially private mechanism, a privacy parameter and a boosting rate that increases variance in outputs for the kernel differentially private mechanism using the preferred region; receiving, from a downstream system, a query for data from a dataset; generating a response to the query that includes noise data using the kernel differentially private mechanism that includes the privacy parameter; and transmitting, to the downstream system, the response to the query.

20 Claims, 3 Drawing Sheets

(56) References Cited

OTHER PUBLICATIONS

Awan et al.,“Canonical noise distributions and private hypothesis tests,” The Annals of Statistics, Apr. 2023, 51(2):547-572.
Balle et al., “Privacy amplification by subsampling: Tight analyses via couplings and divergences,” CoRR, arXiv: 1807.01647, Nov. 2018, 22 pages.
Becker et al., “Adult,” UCI Machine Learning Repository, Apr. 1996, retrieved on Dec. 2024, retrieved from URL<https://archive.ics.uci.edu/dataset/2/adult>, 8 pages.
Bun et al., “Concentrated differential privacy: Simplifications, extensions, and lower bounds,” Theory of Cryptography Conference, Beijing, China, Oct. 31-Nov. 3, 2016, 635-658.
Croft et al., “Differential privacy via a truncated and normalized laplace mechanism,” Journal of Computer Science and Technology, Mar. 2022, 37(2):369-388.
Dong et al., “Gaussian Differential Privacy,” Journal of the Royal Statistical Society Series B: Statistical Methodology, Feb. 2022, 84(1):3-37.
Dwork et al., “Boosting and differential privacy,” in 2010 IEEE 51st Annual Symposium on Foundations of Computer Science, Oct. 2010, 51-60.
Dwork et al., “Calibrating noise to sensitivity in private data analysis,” Theory of Cryptography: Third Theory of Cryptography Conference, New York, USA, Mar. 4-7, 2006, 265-284.
Dwork et al., “Concentrated differential privacy,” CoRR, arXiv:1603.01887, submitted on Mar. 2016, 28 pages.
Dwork et al., “Our data, ourselves: Privacy via distributed noise generation,” in Proceedings of the Annual International Conference on the Theory and Applications of Cryptographic Techniques, St. Petersburg, Russa, May 28- Jun. 1, 2006, 486-503.
Erlingsson et al., “Rappor: Randomized aggregatable privacy-preserving ordinal response,” in Proceedings of the 21st ACM CCS, AZ, USA, Nov. 3-7, 2014, 1054-1067.
Geng et al., “The optimal noise-adding mechanism in differential privacy,” IEEE Transactions on Information Theory, Feb. 2016, 62(2):925-951.
Geng et al., “The staircase mechanism in differential privacy,” IEEE Journal of Selected Topics in Signal Processing, Oct. 2015, 9(7):1176-1184.
Geng et al., “Truncated laplacian mechanism for approximate differential privacy,” CoRR, submitted on Oct. 2018, arXiv:1810.00877, 14 pages.
Holohan et al., “The bounded laplace mechanism in differential privacy,” CoRR, submitted on Aug. 2018, arXiv:1808.10410, 6 pages.
Jiang et al., “Budget recycling differential privacy,” CoRR, submitted on Mar. 2024, arXiv:2403.11445, 19 pages.
Kairouz et al., “The composition theorem for differential privacy,” in Proceedings of the International Conference on Machine Learning, PMLR, Lille, France, Jul. 7-9, 2015, 37:1376-1385.
Koskela et al.,“Computing tight differential privacy guarantees using fft,” in Proceedings of the International Conference on Artificial Intelligence and Statistics, online, Aug. 26-28, 2020, 108:2560-2569.
Koskela et al., “Tight approximate differential privacy for discrete-valued mechanisms using FFT,” CoRR, submitted on Jun. 2020, arXiv:2006.07134, 32 pages.
Ligett et al., “Accuracy first: Selecting a differential privacy level for accuracy constrained ERM,” Advances in Neural Information Processing Systems, CA, USA, Dec. 4-9, 2017, 30, 11 pages.
Mironov, “Renyi differential privacy,” in Proceedings of the 2017 IEEE 30th Computer Security Foundations Symposium (CSF), CA, USA, Aug. 21-25, 2017, 263-275.
Murtagh et al., “The complexity of computing the optimal composition of differential privacy,” in Proceedings of the Theory of Cryptography Conference, Tel Aviv, Israel, Jan. 2016, 9562:157-175.
Nissim et al.,“Smooth sensitivity and sampling in private data analysis,” in Proceedings of the Thirty-Ninth Annual ACM Symposium on Theory of Computing, CA, USA, Jun. 11-13, 2007, 75-84.
Sommer et al., “Privacy loss classes: The central limit theorem in differential privacy,” Cryptology, Aug. 2020, 41 pages.
Soria-Comas et al.,“Optimal data-independent noise for differential privacy,” Information Sciences, Jul. 2013, 250:200-214.
Wang et al., “Locally differentially private protocols for frequency estimation,” in Proceedings of the 26th USENIX Security Symposium (USENIX Security 17), Vancouver, BC, Canada, Aug. 2017, 729-745.
Whitehouse et al., “Brownian noise reduction: Maximizing privacy subject to accuracy constraints,” The Thirty-Sixth Annual Conference on Neural Information Processing Systems (NeurIPS 2022), LA, USA, Nov. 28- Dec. 9, 2022, 35:11 217-11 228.
Xiao et al., “iReduct: Differential privacy with reduced relative errors,” in Proceedings of the 2011 ACM SIGMOD International Conference on Management of Data, SIGMOD ’11, Athens, Greece, Jun. 12-16, 2011, 229-240.
Zhu et al., “Optimal accounting of differential privacy via characteristic function,” in Proceedings of The 25th International Conference on Artificial Intelligence and Statistics, PMLR, online, Mar. 28-30, 2022, 151:4782-4817.

* cited by examiner

DATA DEPENDENT PREFERRED REGION FOR NOISE GENERATION

BACKGROUND

Various systems can communicate over a network. For instance, a client device can send data to a server device, e.g., a cloud computing server. The data communicated over the network can be encrypted to increase data privacy, data security, or both.

SUMMARY

In general, one aspect of the subject matter described in this specification can be embodied in methods that include the actions of computing a preferred region for true query answers for a kernel differentially private mechanism using a noise value for a query for the kernel differentially private mechanism, a true query answer for a query for the kernel differentially private mechanism, and a relative error ratio for the preferred region; computing, for a kernel differentially private mechanism, a privacy parameter and a boosting rate that increases variance in outputs for the kernel differentially private mechanism using the preferred region for true query answers for the kernel differentially private mechanism; maintaining a plurality of output data received from one or more client devices; receiving, from a downstream system, a query for data from a dataset; generating a response to the query that includes noise data using the kernel differentially private mechanism that includes the privacy parameter; and transmitting, to the downstream system, the response to the query.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, the method can include computing a probability that output from the kernel differentially private mechanism falls in the preferred region using, as input to a cumulative density function, an offset that increases a first likelihood that the preferred region remains valid given the dataset for query answers for the kernel differentially private mechanism; and computing the boosting rate using the probability and a confidence level indicating a second likelihood that the output from the kernel differentially private mechanism falls within the preferred region.

In some implementations, computing the probability can include computing the probability using a combination of a first output of the cumulative density function with a first sign of the offset as input and a second output of the cumulative density function with a second, different sign of the offset as input.

In some implementations, computing the privacy parameter can include: computing at least one loss using the boosting rate and, as input to a cumulative density function, the offset, and a sensitivity of the query; computing at least one weight using, as input to a cumulative density function, the offset, a sensitivity of the query; and computing the privacy parameter using the at least one loss and the at least one weight.

In some implementations, the method can include computing a probability that output from the kernel differentially private mechanism falls in the preferred region using the true query answer, the relative error ratio, and an offset that increases a first likelihood that the preferred region remains valid given a dataset for query answers for the kernel differentially private mechanism; and computing the boosting rate using the probability and a confidence level indicating a second likelihood that the output from the kernel differentially private mechanism falls within the preferred region.

In some implementations, computing the probability can include computing the probability using, as input to a cumulative density function, the true query answer, the relative error ratio, and the offset that increases the first likelihood that the preferred region remains valid given the dataset for query answers for the kernel differentially private mechanism.

In some implementations, computing the preferred region can use the true query answer for a query for the kernel differentially private mechanism, the relative error ratio for the preferred region, and an offset that increases a likelihood that the preferred region remains valid given a dataset for query answers for the kernel differentially private mechanism.

In some implementations, the method can include computing the offset using a dataset that includes the preferred region and the true query answer to increase a likelihood that the preferred region remains valid for true query answers to queries.

The subject matter described in this specification can be implemented in various implementations and may result in one or more of the following advantages. In some implementations, the systems and methods described in this specification can increase privacy, security, or both, compared to other systems, by computing a privacy parameter, a boosting parameter, or both, using data for a preferred region computed using a noise value, a true query answer, a relative error ratio, an offset, or any combination of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
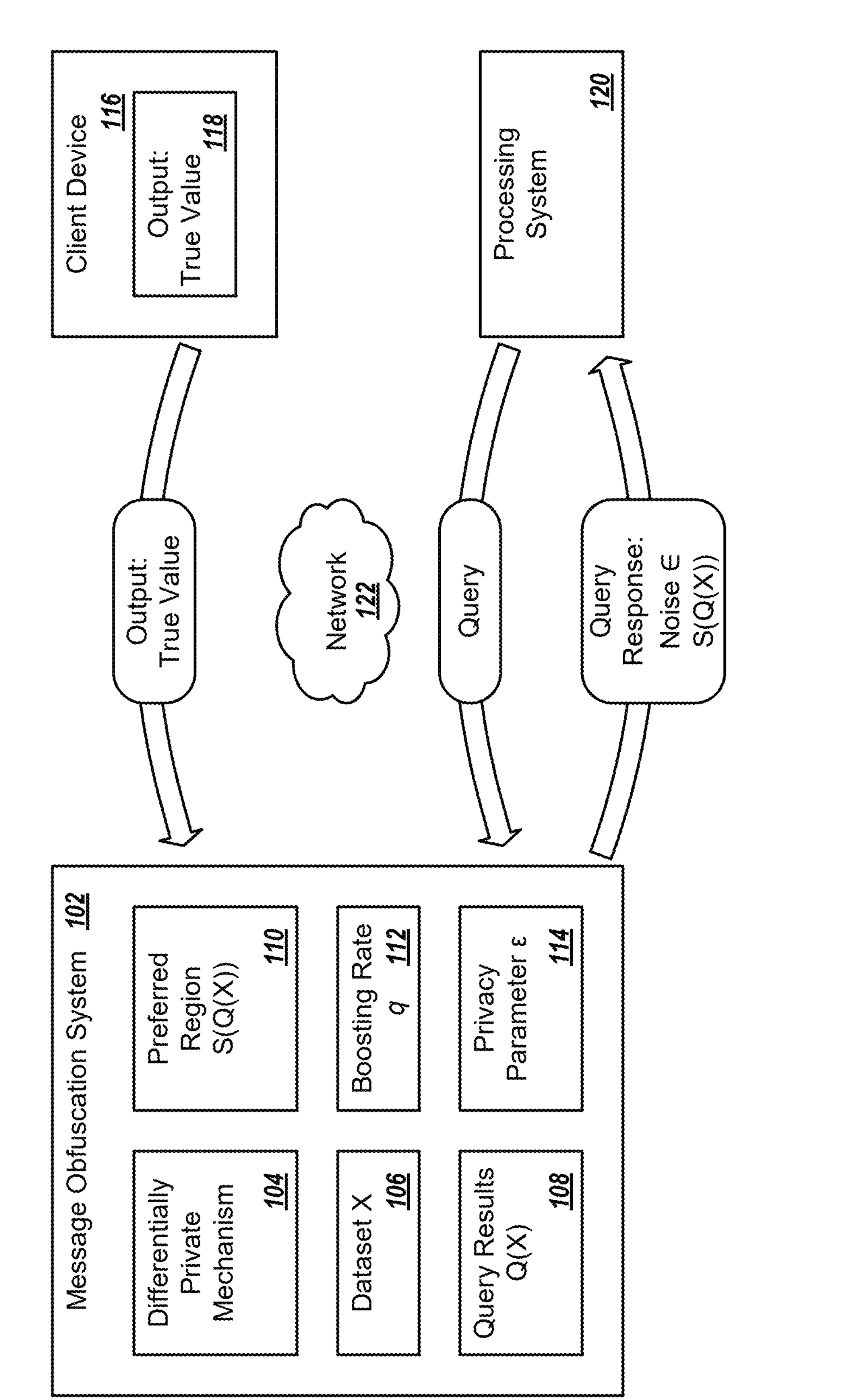
FIG. 1 depicts an example environment in which a message obfuscation system uses data for a preferred region to generate noise.

Some client devices can transmit data to a processing system, e.g., a server or a cloud system, for analysis.

Sending plain text data can have privacy concerns, security concerns, or both. For instance, a malicious actor can access the data before it is received by the recipient processing system. In some examples, the recipient processing system shouldn't be allowed access to data that is not anonymized, e.g., given user permissions.

To increase data security, data privacy, or both, a message obfuscation system can perform one or more differential privacy operations on output data for a client device. The message obfuscation system can be a central, e.g., trusted, differentially private system that receives output data from client devices. The message obfuscation system can later receive, from a processing system, queries for results from the output data and adds noise to the query responses, e.g., generate responses that include noise along with data from messages generated by the client devices. The addition of noise to the true query answers of queries can increase a likelihood that the output is sufficiently obfuscated, which can increase privacy, data security, or both.

The magnitude of noise required to meet a specified privacy level can be determined by the privacy parameter E. When ε has a higher privacy level, e.g., has a smaller value, the privacy parameter ε can require that a message obfuscation system generates more noise, has a higher likelihood of generating noise, or both, in the query answers. Having a higher privacy level for the privacy parameter ε can degrade the utility of the query answers, e.g., the processing system might be unable to accurately perform operations on the query answers when the query answers included data that is impractical or even useless for analysis.

To increase a utility of the output data, e.g., while having a sufficiently high privacy level, the message obfuscation system can dynamically balance privacy and utility using a preferred region for the output. The preferred region can be determined given one or more utility requirements for processing the output data. In some implementations, the message obfuscation system can select the preferred region using data that indicates responses to queries. For instance, the message obfuscation system can select the preferred region using noise data, data for true query answers, or both.

The use of the preferred region can enable the processing system, the message obfuscation system, or both, to process messages that use a privacy parameter that can vary depending on the true value being reported, that increase a probability that noise data falls within the preferred region, e.g., tailored to the true query answers, or both. This can reduce a probability that the noise data is "out of bounds" and does not align with a range in which true values would fall, e.g., defined by the preferred region. This can occur when the preferred region includes non-negative values for which negative noise values would be inherently invalid. In some examples, depending on the types of the results, results that erroneously reverse an expected ordering can be invalid, e.g., when the order of operations in the noise data would be impossible to occur.

Further, a low absolute error for a small true value does not necessarily imply high accuracy, and a high absolute error for a large true value may still be acceptable depending on the type of data included in the output. By using data for the preferred region, e.g., a probability that an output value will or will not fall within the preferred region, the processing system, or another system that determines values for the differentially private mechanism, can determine an error that satisfies an error criterion given the preferred region for the output. The use of the error, e.g., privacy parameter, determined using the preferred region can increase a probability that the noise data is in the preferred region for true query answers.

As discussed in more detail below, X can be the dataset from which the output is selected, Q(X) is a query on the dataset X, and S(Q(X)) is the preferred region for the output values. ρ can be a confidence level indicating a probability that noise output falls within the preferred region S(Q(X)) and pb can indicate that a corresponding value can be privacy boosting. Given a differentially private mechanism $M_{pb}$, e.g., a central differentially private mechanism that executes on the message obfuscation system, a system can select a preferred region S(Q(X)) to increase a likelihood that the utility guarantee of Equation (1), below, is true.

$$Pr[M_{pb}(X) \in S(Q(X))] \geq \rho \tag{1}$$

The system can compute a privacy parameter ε, a boosting rate q, or both, using data for the preferred region S(Q(X)). The system can compute both values using a privacy budget that allocates between the kernel differentially private mechanism, e.g., ε, and the boosting rate q. The system can use these values for δ or α differentially private mechanisms, e.g., for which $\delta_0$ and α can be determined according to specific application requirements.

FIG. 1 depicts an example environment 100 in which a message obfuscation system 102 uses data for a preferred region to generate noise y, e.g., to at least partially obfuscation query responses. The message obfuscation system 102 can use a differentially private mechanism 104, e.g., a differentially private kernel mechanism, to generate the noise y. The message obfuscation system 102 can generate weights for, e.g., reweight, the differentially private mechanism 104 using a probability density function according to a noise distribution. The differentially private mechanism 104 can be implemented as an engine on the message obfuscation system 102.

The message obfuscation system 102 can maintain data that indicates a dataset X 106, one or more query results Q(X) 108 given a query Q, and a preferred region S(Q(X)) 110 for the dataset X 106 given a query results Q(X) 108. The dataset X 106 can include the set of potential responses to queries, e.g., integer values. The preferred region S(Q(X)) 110 can indicate output data 118 that the message obfuscation system 102 can receive from any of multiple client devices 116. These output data 118 can be true values from the dataset X 106 in that the output data 118 include values generated by at least one corresponding client device 116 and are not just noise. For instance, when the dataset X 106 includes integer values, but queries Q on the dataset X 106 are for ages, the preferred region S(Q(X)) 110 can include integer values between 0 and 100 or 130.

The message obfuscation system 102 can use any appropriate noise adding mechanism for the differentially private mechanism 104, e.g., give a target problem. For instance, the message obfuscation system 102 can use discrete Gaussian, Laplacian, or a combination of both, for the noise adding mechanism. These noise adding mechanisms, without the use of a preferred region, could generate noise integer values y that fall outside the preferred region S(Q(X)) 110, e.g., values of −1 or 150. This noise data y can cause errors for a downstream processing system 120 that processes the output data from the client devices 116.

To reduce the probability that the differentially private mechanism 104 generates noise outside the preferred region S(Q(X)) 110, the message obfuscation system 102 can use data for the preferred region S(Q(X)) 110 for the differentially private mechanism 104. For instance, the message obfuscation system 102 can select values, e.g., weights, for the differentially private mechanism 104 to cause the differentially private mechanism 104 to generate output that includes a noise query answer as y~$f_{pb}$ (•|Q(X)) with $f_{pb}$ being the probability density function for the differentially private mechanism 104 (M) defined using Equation (2), below. This can indicate that the distribution of the noise values y is standard normal in the preferred region S(Q(X)) 110 given the probability density function $f_{pb}$. In Equation (2), $\overline{p}_{S(Q(X))}$ is a probability that the output from the differentially private mechanism 104 does not fall in the preferred region S(Q(X)) 110 as defined in Equation (3), below, and q is a boosting rate 112 as defined in Equation (4), below. $p_{S(Q(X))}$ is a probability that the output from the differentially private mechanism 104 falls in the preferred region S(Q(X)) 110.

$$f_{pb}(y \mid Q(X)) = \begin{cases} \frac{f_M(y)}{1-\overline{p}_{s(Q(X))}q}, & \text{if } y \in S(Q(X)) \\ \frac{f_M(y)(1-q)}{1-\overline{p}_{s(Q(X))}q}, & \text{otherwise} \end{cases} \tag{2}$$

$$\overline{p}_{s(Q(X))} \triangleq \int_{y \notin S(Q(X))} f_M(y)dy \tag{3}$$

$$q = \max_{Q(X)} \frac{1}{\rho} + \frac{1}{\overline{p}_{s(Q(X))}} - \frac{1}{\rho\overline{p}_{s(Q(X))}} \tag{4}$$

The differentially private mechanism 104 can use the boosting rate q 112 to increase the probability that the noise values y fall within the preferred region S(Q(X)) 110. For instance, the probability distribution of the probability density function $f_{pb}$ can be defined in Equation (5), below. Equation (5) can indicate that the probability density function $f_{pb}$ has a valid probability distribution.

$$\int_{-\infty}^{\infty} f_{pb}(y \mid Q(X))dy = 1 \tag{5}$$

When the confidence level p satisfies Equation (6), below, the differentially private mechanism 104 can satisfy the utility constraint without any changes to its weights, and the boosting rate q becomes 0. When ρ←1, q←1 and the resulting noise distribution can be a normalized $f_M$ with output support bounded within S(Q(X)). As a result, when the confidence level ρ does not satisfy Equation (6) below, the differentially private mechanism 104 can use non-zero values for the confidence level ρ and the boosting rate q, e.g., values that tend to 1.

$$\rho \leq \min_{Q(X)} p_{S(Q(X))} \left(p_{S(Q(X))} = 1 = \overline{p}_{s(Q(X))}\right) \tag{6}$$

The privacy loss distribution of the differentially private mechanism 104 can be a function of the, e.g., kernel, differentially private mechanism 104 and the boosting rate q. The privacy loss distribution $f_r$ can denote the privacy loss distribution with respect to Γ. The privacy loss distribution can be verified using neighboring datasets X and X'. The privacy boosting mechanism can have a privacy loss random variable Γ, as defined in Equations (7) and (8), below. In Equation (7), the noise value y~M(X). In Equation (8), the noise value y~M(X').

$$\Gamma_{X/X'} \triangleq \log\frac{M(X)(y)}{M(X')(y)} \tag{7}$$

$$\Gamma_{X'/X} \triangleq \log\frac{M(X')(y)}{M(X)(y)} \tag{8}$$

The privacy losses $\mathcal{L}_1$ and $\mathcal{L}_2$ can be defined as in Equations (9) and (10), respectively and below.

$$\mathcal{L}_1 \triangleq \log\left(\frac{1-\overline{p}_{S(Q(X'))}q}{1-\overline{p}_{S(Q(X))}q}\right) \tag{9}$$

$$\mathcal{L}_2 \triangleq -\log(1-q) \tag{10}$$

For the privacy loss random variable Z of the differentially private mechanism 104, and the corresponding privacy loss distribution fz, the shifted privacy loss distribution $f'_Z(z)$ can be defined using Equation (11), below.

$$f'_Z(z) \triangleq f_Z(z-\mathcal{L}_1) \tag{11}$$

Boundaries $\tau_u$ and $\tau_l$ can be determined using Equations (12) and (13), respectively and below. These boundaries can be used as utility parameters, e.g., that indicate upper and lower bounds for the preferred region S(Q(X)).

$$\tau_u \triangleq supS(Q(X)) \tag{12}$$

$$\tau_l \triangleq infS(Q(X)) \tag{13}$$

Given the above and the privacy boosting mechanism for a pair of neighboring datasets X, X', the privacy loss distribution $f_r$ with respect to Γ can be defined as a function of the privacy loss distribution fz of the differentially private mechanism 104 and can be represented as defined in Equation (14), below. In Equation (14), weights $W_1$, $W_2$, and $W_3$ are defined by Equations (15), (16), and (17), respectively and below.

$$f_\Gamma(\gamma) = W_1 f'_Z(\gamma-\mathcal{L}_2) + W_2 f'_Z(\gamma+\mathcal{L}_2) + W_3 f'_Z(\gamma) \tag{14}$$

$$W_1 = \int_{min\{\tau_u,\tau'_u\}}^{max\{\tau_u,\tau'_u\}} f_{M(X)}(y)dy \tag{15}$$

$$W_2 = \int_{min\{\tau_l,\tau'_l\}}^{max\{\tau_l,\tau'_l\}} f_{M(X)}(y)dy \tag{16}$$

$$W_3 = 1 - W_1 - W_2 \tag{17}$$

The differentially private mechanism 104 can use the privacy loss $\mathcal{L}_1$, e.g., the privacy loss $\mathcal{L}_1$ can be added to the kernel differential privacy loss. The privacy loss $\mathcal{L}_1$ can cause a shift in the privacy loss distribution of the differentially private mechanism 104. This shift can be a result of the different probabilities of $\overline{p}_{S(Q(X'))}$ and $\overline{p}_{S(Q(X))}$, e.g., given a potential discrepancy between S(Q(X')) and S(Q(X)).

Depending on the region in which the noise output falls, the differentially private mechanism 104 can incur one of two types of privacy leakages, e.g., losses: $\mathcal{L}_1$ and $-\mathcal{L}_1$. These privacy leakages can correspond to $\{y \in S(Q(X));\ y \notin S(Q(X'))\}$ and $\{y \in S(Q(X'));\ y \notin S(Q(X))\}$, respectively. The probabilities of these two events can be denoted by the weights $W_1$ and $W_2$, respectively, when $y \sim M(X)$.

In some implementations, the privacy loss distribution $f_r$ can characterize a (ε, δ) differentially private ("(ε, δ)-DP") mechanism. For instance, Equation (18), below, can represent a privacy profile for a privacy boosting differentially private mechanism. When the privacy loss random variable is Z, $\delta_Z(\varepsilon)$ can denote the privacy profile given a privacy parameter ε 114. The privacy profile $\delta_\Gamma(\varepsilon)$ can be based on a shifted privacy profile of the differentially private mechanism 104, e.g., shifted because of the probability density function $f_{pb}$.

$$\delta_\Gamma(\varepsilon) = \max_{X, X'} \{W_1\delta'_Z(\varepsilon - \mathcal{L}_2) + W_2\delta'_Z(\varepsilon + \mathcal{L}_2) + W_3\delta'_Z(\varepsilon)\} \tag{18}$$

In Equation (18), the privacy profile $\delta_\Gamma(\varepsilon)$ can be a linear combination of the privacy profile of the kernel differentially private mechanism evaluated at different privacy leakages weighted at their respective probabilities of occurring.

In some implementations, when the leakage of the differentially private mechanism 104 satisfies $(\alpha, \varepsilon_0)$ for Rényi differential privacy ("RDP"), the privacy boosting mechanism can be $(\alpha, \varepsilon_0)$-RDP for Equation (19), below. The value ε can be a privacy parameter 114.

$$\varepsilon = \varepsilon_0 + \max_{X, X'} \left\{\mathcal{L}_1 + \frac{1}{\alpha - 1}\log\left[W_1 e^{(\alpha-1)\mathcal{L}_2} + W_2 e^{-(\alpha-1)\mathcal{L}_2} + W_3\right]\right\} \tag{19}$$

In some implementations, the message obfuscation system 102 can select the pair of neighboring datasets X, X' as the dataset pair that maximizes Equation (19), above. The pair of neighboring datasets X, X' can be a pair of datasets that has at most, e.g., exactly, one element that is different between the two datasets. By using the pair of neighboring datasets, the message obfuscation system 102 can more accurately select the boosting rate q compared to other systems, e.g., the message obfuscation system 102 can maximize the privacy leakage caused by the boosting rate q, which can select a more optimal privacy parameter ε, resulting in an overall leakage that satisfies a leakage criterion, e.g., that is low.

The message obfuscation system 102 can use the privacy parameter ε 114, for the differentially private mechanism 104, and the boosting rate q 112 to add noise to query responses. The message obfuscation system 102 can allocate a privacy budget between the privacy parameter ε 114 and the boosting rate q 112, e.g., while satisfying one or more utility requirements, minimizing privacy leakage, or both. To determine values for both the privacy parameter ε 114 and the boosting rate q 112, the message obfuscation system 102 can use the algorithm described in Table 1, below.

The message obfuscation system 102 can use either δ or α for the, e.g., kernel, differentially private mechanism. For instance, Table 1 indicates that α is optional with the input value of "(α)". For instances in which the algorithm includes α, the message obfuscation system 102 performs the operations defined on lines 13-14, e.g., and not operations 10-11. In these instances, the message obfuscation system 102 need not use δ. For instances in which the message obfuscation system 102 uses δ, e.g., and not a, the message obfuscation system 102 can perform the operations defined on lines 10-11, e.g., and not operations for lines 13-14. Irrespective of the type of differentially private mechanism, the message obfuscation system 102 can perform operations 1-9 and 15-21 for the algorithm described in Table 1. In some instances, the differentially private mechanism 104, e.g., whether δ or α, can be fixed. In some implementations, the differentially private mechanism 104 can be adjusted according to specific application requirements.

In some implementations, one or more of the boosting rate q 112 or the privacy parameter ε 114 can affect a probability of noise falling in the preferred region $p_{S(Q(X))}$. For instance, a larger privacy parameter so can increase the probability of the noise, e.g., output from the differentially private mechanism 104, falling in the preferred region S(Q(X)) 110. This can result in the use of a smaller boosting rate q 112. Since a larger privacy parameter ε 114 can result in a lower likelihood of noise, e.g., lower privacy, the smaller boosting rate q 112 can offset the potential loss by being a smaller value, e.g., resulting in a higher privacy, a smaller privacy loss incurred by the discrepancy in the boosting region, or both. As a result, a, e.g., optimal, differentially private mechanism 104 can embody a tailored privacy budget allocated between the privacy parameter ε 114 and the boosting rate q 112.

The message obfuscation system 102 can compute the combination of the boosting rate q 112 and the privacy parameter ε 114 in any appropriate manner. For instance, the message obfuscation system 102 can search for, e.g., optimal, values that minimize the total privacy parameter ε 114. These potentially optimal values can be local optima or global optima. The message obfuscation system 102 can perform a search, as part of the computation for one or both of these values, for a peak that has a total privacy loss that satisfies a privacy loss criterion, e.g., minimizes the total privacy loss. The message obfuscation system 102 can use a ternary search for finding the peak. The peak can be a peak of a convex or a concave function.

In Table 1, below, values with a ' can be associated with the dataset X', while values without the ' can be associated with the dataset X. In Table 1, below, the final value for the privacy parameter ε can be bounded, e.g., by a lower value such as 0 and a higher value $\varepsilon_{max}$, to control, e.g., minimize, privacy leakage. This can increase privacy, security, or both, for the data processed by the message obfuscation system 102.

The value "tol" can be a tolerance for the algorithm. The message obfuscation system 102 can determine the tolerance in any appropriate manner. For instance, the message obfuscation system 102 can select a tolerance tol that satisfies a convergence threshold, e.g., tol can be an arbitrarily small value to increase a likelihood of better performance for the differentially private mechanism. A smaller tol value can increase a likelihood of convergence to parameters, e.g., the privacy parameter ε and the boosting rate q, that satisfy the convergence threshold, e.g., globally optimal parameters. In some instances, the message obfuscation system 102 can select a tolerance tol to be less than 1% of $\varepsilon_{max}$.

TABLE 1

| Privacy parameter $\varepsilon_0$ and boosting rate q algorithm |
|---|
| Input: ρ, δ, (α), $\Delta_f$, X, X', tol.<br>Output: Optimal $\varepsilon_0$. |

TABLE 1-continued

| Privacy parameter $\varepsilon_0$ and boosting rate q algorithm |
| --- |
| 1: $\varepsilon_{low} \leftarrow 0$, $\varepsilon_{up} \leftarrow \varepsilon_{max}$; |
| 2: $\tau_1, \tau_u, \tau'_1, \tau'_u \leftarrow$ Eq. (12, 13)(X, X'); |
| 3: while $\varepsilon_{up} - \varepsilon_{low}$ > tol do |
| 4: $\varepsilon_1 \leftarrow \varepsilon_{low} + \frac{\varepsilon_{up} - \varepsilon_{low}}{3}, \varepsilon_2 \leftarrow \varepsilon_{up} - \frac{\varepsilon_{up} - \varepsilon_{low}}{3}$; |
| 5: Get $q_1$, $q_2$via Eq. (4) corresponding to ($\varepsilon_1$, $\varepsilon_2$); |
| 6: $\mathcal{L}_1^1, \mathcal{L}_2^1 \leftarrow Eq.(9-10)(\varepsilon_0 = \varepsilon_1, q_1, X, X')$; |
| 7: $\mathcal{L}_1^2, \mathcal{L}_2^2 \leftarrow Eq.(9-10)(\varepsilon_0 = \varepsilon_2, q_2, X, X')$; |
| 8: $W_1^1, W_2^1 \leftarrow Eq.(15-16)(\varepsilon_0 = \varepsilon_1, S(Q(X)), S(Q(X')))$; |
| 9: $W_1^2, W_2^2 \leftarrow Eq.(15-16)(\varepsilon_0 = \varepsilon_2, S(Q(X)), S(Q(X')))$ |
| 10: $(\varepsilon_1', \delta) \leftarrow Eq.(18)(\mathcal{L}_1^1, \mathcal{L}_2^1, W_1^1, W_2^1)$; |
| 11: $(\varepsilon_2', \delta) \leftarrow Eq.(18)(\mathcal{L}_1^2, \mathcal{L}_2^2, W_1^2, W_2^2)$; |
| 12: or |
| 13: $(\alpha, \varepsilon_1') \leftarrow Eq.(19)(\mathcal{L}_1^1, \mathcal{L}_2^1, W_1^1, W_2^1)$; |
| 14: $(\alpha, \varepsilon_2') \leftarrow Eq.(19)(\mathcal{L}_1^2, \mathcal{L}_2^2, W_1^2, W_2^2)$; |
| 15: if $\varepsilon'_1 > \varepsilon'_2$ then |
| 16: $\varepsilon_{low} \leftarrow \varepsilon_1$; |
| 17: else |
| 18: $\varepsilon_{up} \leftarrow \varepsilon_2$; |
| 19: end if |
| 20: end while |
| 21: return $(\varepsilon_{up} + \varepsilon_{low})/2$ |

After performing the algorithm in Table 1, the message obfuscation system 102 can store the resulting privacy parameter so in memory, e.g., in a database. The message obfuscation system 102 can compute, using Equation (4) above, the boosting rate q 112 using the privacy parameter co. The message obfuscation system 102 can store the boosting rate q 112 in memory, e.g., in the same database as or a different database than the database in which the privacy parameter ε0 is maintained.

The message obfuscation system 102 can use one or more privacy parameters to generate noise data, e.g., one or more noise values, in response to a query. For instance, the message obfuscation system 102 can receive output data 118, e.g., messages, from multiple client devices 116. The output data 118 can include true values, e.g., values that were not generated as noise data. The message obfuscation system 102 can store at least some, e.g., all, of the output data in a database.

When the message obfuscation system 102 receives a query Q from the processing system 120, the message obfuscation system 102 can determine responsive data from the database. For instance, the message obfuscation system 102 can execute one or more queries on the database that maintains the output data to retrieve responsive output data from the database.

The message obfuscation system 102 can add noise data to the responsive output data. This can increase privacy, security, or both, for the responsive output data. For instance, the message obfuscation system 102 can use the boosting rate q 112, the privacy parameter ε 114, or both, to generate noise data. By using one or both of the boosting rate q 112 or the privacy parameter ε 114, the message obfuscation system 102 can generate noise data with a higher probability of being in the preferred region S(Q(X)) 110, e.g., can generate noise data that is only in the preferred region S(Q(X)) 110.

The message obfuscation system 102 can respond to the query with at least some of the responsive data and the noise data. For instance, the message obfuscation system 102 can generate a response that includes some, e.g., all, of the responsive data and the noise data. The message obfuscation system 102 can transmit the response to the processing system.

In some implementations, the message obfuscation system 102 can compute the preferred region. For instance, when the preferred region, e.g., utility definition, depends on the true query answer, the message obfuscation system 102 can compute the preferred region S(Q(X)) using Equation (20), below. In Equation (20), y is a noise value, θ is a relative error ratio, and φ is an offset that can increase a likelihood that the preferred region S(Q(X)) remains valid given the dataset X for query answers for the differentially private mechanism 104. In some examples, the offset φ can be greater than zero. In some instances, the offset φ can be zero, e.g., when a difference between a corresponding true value and the boundary of the preferred region S(Q(X)) satisfies a difference threshold. The relative error ratio θ can be in [0,1], e.g., a value between zero and one, inclusive.

$$S(Q(X)) \triangleq \{y : \|y - Q(X)\|_l \le \theta \|Q(X)\|_l + \varphi\} \tag{20}$$

Given the preferred region S(Q(X)), the message obfuscation system 102 can compute one or more of the probability $p_{S(Q(X))}$, the boosting rate q, a loss value, a weight, or a combination of these, e.g., using different Equations than those described above. For instance, for a one-dimensional query answer and relative error bounds, $\phi_M$ can denote a cumulative density function of noise in the differentially private mechanism 104, e.g., centered at zero. The message obfuscation system 102 can compute the probability $p_{S(Q(X))}$ using Equation (21), below. The minimal probability min $p_{S(Q(X))}$ can occur when the true query answer Q(X)=0, yielding Equation (22), below, for the probability $p_{S(Q(X))}$.

$$p_{S(Q(X))} = \Phi_M(\theta|Q(X)| + \varphi) - \Phi_M(-\theta|Q(X)| - \varphi) \tag{21}$$

$$\min p_{S(Q(X))} = p_{S(0)} = \Phi_M(\varphi) - \Phi_M(-\varphi) \tag{22}$$

Given the minimal probability min $p_{S(Q(X))}$ above, the message obfuscation system 102 can compute the boosting rate q using Equation (23), below. As indicated above, ρ can be a confidence level indicating a probability that noise output falls within the preferred region S(Q(X)).

$$q = \frac{1}{\rho} + \frac{1}{1 - p_{S(0)}} - \frac{1}{\rho(1 - p_{S(0)})} \tag{23}$$

The message obfuscation system 102 can compute, e.g., as parameters for the privacy loss distribution, one or more loss values using Equations (24) and (25), below, and one or more weights using Equations (26) and (27), below. In these equations, $\Delta_Q$ can be the sensitivity of the query. The one or more weights can be likelihoods.

$$\mathcal{L}_1 = \log\left(\frac{1 - (1 - \Phi_M(\theta\Delta_Q + \varphi) + \Phi_M(-\theta\Delta_Q - \varphi))q}{1 - (1 - \Phi_M(\tau_u) + \Phi_M(\tau_l))q}\right) \tag{24}$$

$$\mathcal{L}_2 = -\log(1 - q) \tag{25}$$

$$W_1 = \Phi_M(\theta\Delta_Q + \varphi) - \Phi_M(\varphi) \tag{26}$$

-continued $$W_2 = \Phi_M(\theta\Delta_Q - \varphi) - \Phi_M(-\varphi) \quad (27)$$

The message obfuscation system 102 can use one or more of Equations 23 to 27 to compute one or both of the privacy parameter ε 114 or the boosting rate q, e.g., as part of an iterative process as described in the algorithm shown in Table 1. For instance, the message obfuscation system 102 can use Equation 23 instead of Equation 4, Equations 24-25 instead of Equations 9-10, can use Equations 26-27 instead of Equations 15-16, or any combination of these. For the computation of Equation 23, the message obfuscation system 102 can use one of Equations 21 or 22.

In some implementations, another system computes the preferred region S(Q(X)) 110, the boosting rate q 112, the privacy parameter ε 114, or both. In these implementations, the other system can transmit the computed values to the message obfuscation system 102 for use generating noise data in response to receipt of a query.

The message obfuscation system can be any appropriate type of system. For instance, the message obfuscation system can be a central differentially private system, e.g., implemented on a system separate from the client device 116 and the processing system 120. In some examples, the message obfuscation system can be implemented, at least in part, on the client device 116. In these implementations, the client device 116 can compute the probability density function, the privacy parameter, or both, and receive one or more queries from the processing system 120.

The data in the data sets X, X', the corresponding true query answers, the noise data y, and the preferred region S(Q(X)) can be any appropriate type of data. For instance, the datasets and region can have discrete valued data, continuous valued data, or both. The true query answers and the noise data can be discrete valued data or continuous valued data.

The message obfuscation system 102 can be used for any appropriate type of data obfuscation process. For example, although the environment 100 is described with respect to obfuscating messages, the message obfuscation system 102 can use the differentially private mechanism 104, the preferred region S(Q(X)) 110, the boosting rate q 112, the privacy parameter ε 114, or any combination of these, for privacy-preserving machine learning, model training, query responses, decentralized data collection, federated learning, cross region data collection, or any combination of these.

The message obfuscation system 102, and the processing system 120, are each an example of a system implemented as computer programs on one or more computers in one or more locations, in which the systems, components, and techniques described in this specification are implemented. The client device 116 can include personal computers, mobile communication devices, such as cellular telephones, and other devices that can send and receive data over a network 122. The network 122, such as a local area network ("LAN"), wide area network ("WAN"), the Internet, or a combination thereof, connects the message obfuscation system 102, the client device 116, and the processing system 120. Either or both of the systems 102, 120 can use a single computer or multiple computers operating in conjunction with one another, including, for example, a set of remote computers deployed as a cloud computing service.

The message obfuscation system 102 can include several different functional components, including the differentially private mechanism 104. Any one or more of the components can include one or more data processing apparatuses, can be implemented in code, or a combination of both. For instance, each of the components can include one or more data processors and instructions that cause the one or more data processors to perform the operations discussed in this specification.

The various functional components of the message obfuscation system 102 can be installed on one or more computers as separate functional components or as different modules of a same functional component. For example, the differentially private mechanism 104 can be implemented as computer programs installed on one or more computers in one or more locations that are coupled to each through a network.

Figure 2:
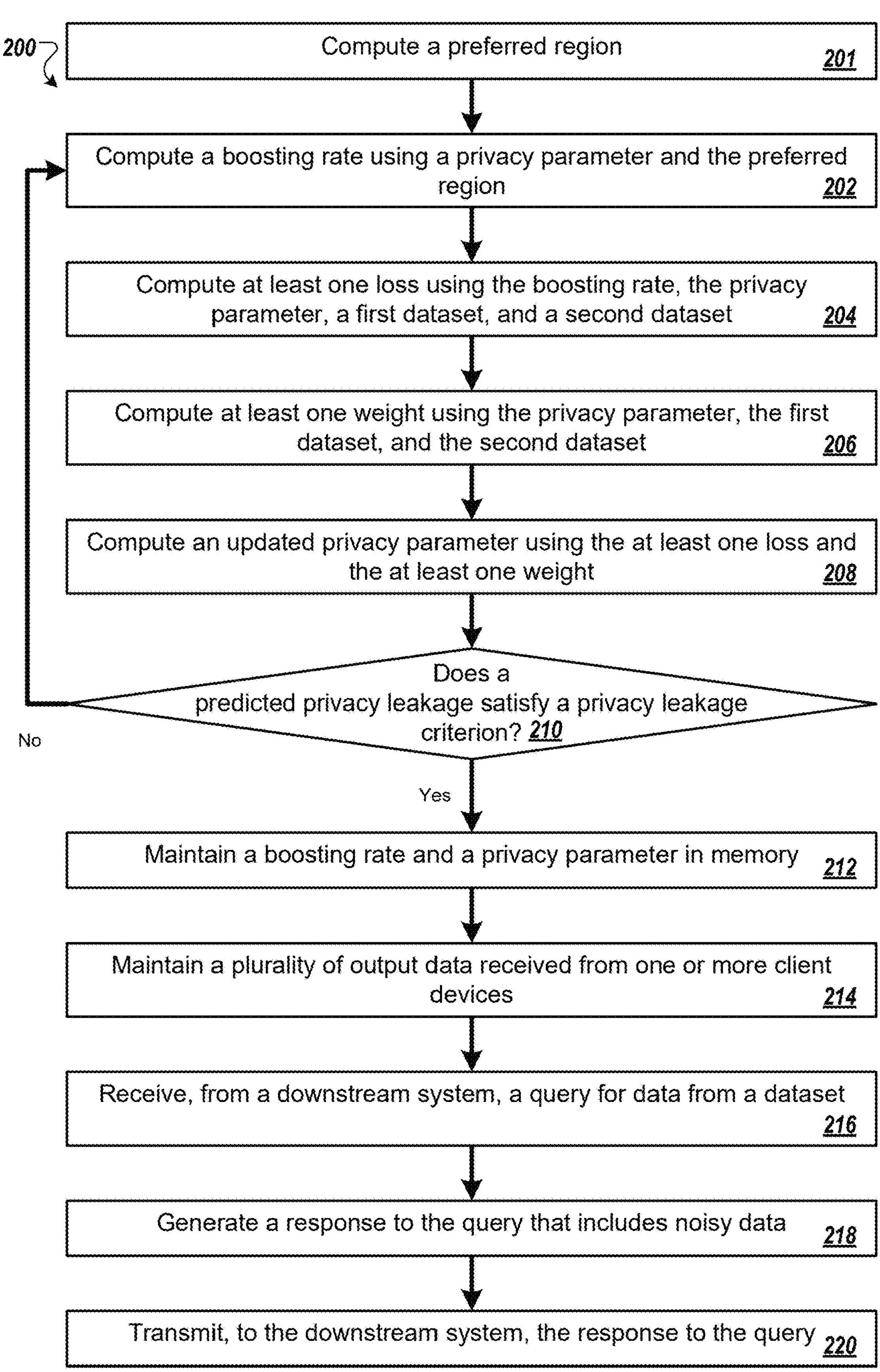
FIG. 2 is a flow diagram of an example process for computing a boosting rate and a privacy parameter.

FIG. 2 is a flow diagram of an example process 200 for computing a boosting rate and a privacy parameter. For example, the process 200 can be used by the message obfuscation system 102 from the environment 100.

A system computes a preferred region (201). The system can compute the preferred region given a dataset X that includes data for responses to queries. For instance, the preferred region can be for true query answers for a kernel differentially private mechanism. The system can use Equation (20), above, to compute the preferred region.

The system can compute the preferred region using any appropriate data. For example, the system can compute the preferred region using a noise value for a query for the kernel differentially private mechanism, a true query answer for a query for the kernel differentially private mechanism, a relative error ratio for the preferred region, an offset that increases a likelihood that the preferred region remains valid given a dataset for query answers for the kernel differentially private mechanism, or any combination of these. In some instances, the system can compute the offset using a dataset X that includes the preferred region and the true query answer. The system can compute the offset that increases a likelihood that the preferred region remains valid for true query answers to queries.

The system computes a boosting rate using a privacy parameter and the preferred region (202). For instance, the system can compute the boosting rate using Equation (23), above. In some examples, the system can compute multiple boosting rates, e.g., two boosting rates. Each boosting rate can be for a different dataset, e.g., X and X'. The preferred region can be a preferred region for true query answers for the kernel differentially private mechanism. In some examples, the system can compute the boosting rate using a probability $p_{S(Q(X))}$ that the output from the kernel differentially private mechanism falls in the preferred region.

The system can compute the probability using any appropriate process. For instance, the system can use either Equation (21) or Equation (22), both above, to compute the probability. The system can compute the probability that the output from the kernel differentially private mechanism falls in the preferred region using the true query answer, the relative error ratio, and an offset that increases a first likelihood that the preferred region remains valid given a dataset for query answers for the kernel differentially private mechanism. In some instances, the system can compute the probability that the output from the kernel differentially private mechanism falls in the preferred region using, as input to a cumulative density function, an offset that increases a first likelihood that the preferred region remains valid given the dataset for query answers for the kernel differentially private mechanism, e.g., when the true query answer Q(X)=0. The cumulative density function can be defined, at least in part, using the privacy parameter. In some examples, the system can compute the probability using a combination of a first output of the cumulative density function with a first sign of the offset as input and a second output of the cumulative density function with a second, different sign of the offset as input, e.g., as shown in Equation (22), above.

The system computes at least one loss using the boosting rate, the privacy parameter, a first dataset, and a second dataset (204). The datasets can be the datasets X and X'. The system can compute the loss function using Equation (24) or Equation (25), above.

In some instances, the system can compute multiple loss functions. For instance, for the first boosting rate, the system can compute a first loss function using Equation (24) and a second loss function using Equation (25). The system can compute, for the second boosting rate, a third loss function using Equation (24) and a fourth loss function using Equation (25).

In some implementations, the system can use multiple privacy parameters, e.g., computed from the current iteration of the privacy bounds $\varepsilon_{low}$ and $\varepsilon_{up}$. These privacy parameters can be $\varepsilon_1$ and $\varepsilon_2$. The system can compute the loss functions using the respective privacy parameter. For example, for the loss function computations that use the first boosting rate, the system can use the first privacy parameter $\varepsilon_1$. For the loss function computations that use the second boosting rate, the system can use the second privacy parameter $\varepsilon_2$.

The system computes at least one weight using the privacy parameter, the first dataset, and the second dataset (206). The first dataset and the second dataset can be represented by corresponding preferred regions for the datasets. For instance, the system can compute the at least one weight using a first preferred region S(Q(X)) for the first dataset X and a second preferred region S(Q(X')) for the second dataset X'.

The system can compute multiple weights. For instance, the system can compute, for the first privacy parameter $\varepsilon_1$, a first weight using Equation (26), above, and a second weight using Equation (27), above. For the second privacy parameter $\varepsilon_2$, the system can compute a third weight using Equation (26) and a fourth weight using Equation (27).

The system computes an updated privacy parameter using the at least one loss and the at least one weight (208). The system can compute the updated privacy parameter using any appropriate process, e.g., a $\delta$ or $\alpha$ a differential privacy process. In some examples, the system can compute the updated privacy parameter using one of Equations (18) or (19), both above.

In some examples when the system has multiple, e.g., two, privacy parameters, the system can determine which of the multiple privacy parameters to use. For instance, the system can determine which of the privacy parameters has a greater value. In response to determining that the first privacy parameter $\varepsilon_1$ has the greater value, the system can update the lower privacy bound $\varepsilon_{low}$ to be equal to the first privacy parameter $\varepsilon_1$. In response to determining that the first privacy parameter $\varepsilon_1$ does not have the greater value, the system can update the upper privacy bound $\varepsilon_{up}$ to be equal to the second privacy parameter $\varepsilon_2$.

The system determines whether a predicted privacy leakage satisfies a privacy leakage criterion (210). The system can compute the predicted privacy leakage using a current value of the privacy parameter and the boosting rate or just the privacy parameter. In some instances, the system can compare the predicted privacy leakage with the privacy leakage criterion to determine whether the predicted privacy leakage satisfies the privacy leakage criterion. In response to determining that the predicted privacy leakage does not satisfy the privacy leakage criterion, the system can compute an updated boosting rate, e.g., proceed to operation 202.

The system maintains a boosting rate and a privacy parameter in memory (212). The system can store the boosting rate and the privacy parameter in memory in response to determining that the predicted privacy leakage satisfies the privacy leakage criterion. When the system has multiple privacy parameters, the system can store a combination, e.g., the average, of the multiple privacy bounds, e.g., $\varepsilon_{low}$ and $\varepsilon_{up}$, in memory. In these implementations, the system can compute the boosting rate using the combination of the privacy parameters to compute the boosting rate. The system can store the computed boosting rate in memory.

The system maintains a plurality of output data received from one or more client devices (214). For example, the system can receive respective portions of the output data from respective ones of the client devices. Some of the different portions of the output data can be received from the same client device, e.g., as part of different respective messages. Some of the different portions of the output data is received from different ones of the client devices.

The system receives, from a downstream system, a query for data from a dataset (216). The query can be any appropriate query Q for data from a dataset X.

The system generates a response to the query that includes the noise data using the privacy parameter that was computed using the probability density function (218). The response Q(X) can include one or more true values, e.g., from the output data received from the client devices. The system can use any appropriate process to generate the noise data, e.g., any appropriate noise-adding mechanism.

The system transmits, to the downstream system, the response to the query (220). The system can use any appropriate protocol or protocols to receive and transmit the query and the response. By providing the response to the downstream system, the system can cause the downstream system to process the data in the response. This can include causing the downstream system to process both the true values and the noise data that were included in the response. The processing can be any appropriate type of processing, e.g., processing of big data.

The order of operations in the process 200 described above is illustrative only, and the computation of the boosting rate and the privacy parameter can be performed in different orders. For example, the process 200 can include operation 214 substantially concurrently with the performance of one or more of operations 202 through 212. In some implementations, the process 200 can include operations 214 and 216 before at least some of the operations 202 through 212.

In some implementations, the process 200 can include additional operations, fewer operations, or some of the operations can be divided into multiple operations. For example, the process 200 can include a computation of the privacy parameter using the boosting rate without performing operations 204 through 206, e.g., when the system computes the privacy parameter using different operations. In some instances, the process 200 can include computing the boosting rate and the privacy parameter using a preferred region for true query answers for the kernel differentially private mechanism, e.g., instead of operations 202 through 208. In these instances, the system can compute the boosting rate using Equation (23), above, and compute the privacy parameter using any appropriate process that uses data for the preferred region, such as a corresponding probability. In some examples, the process might not include operation 208. In some examples, the process 200 might not include operation 206. In some examples, the process 200 might not include operation 204.

For situations in which the systems discussed here collect personal information about people, or may make use of personal information, the people may be provided with an opportunity to control whether programs or features collect personal information, or to control whether and/or how the system operates. In addition, as described above, data is anonymized in one or more ways before it is stored or used, so that personally identifiable information is removed. For example, the message obfuscation system can remove any device or other identification data from output data received from the client devices.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

Operations can occur substantially concurrently in that the operations need not be exactly concurrent but can overlap at least in part. For instance, a first operation can begin and sometime after that a second operation can begin while the first operation is still occurring. Execution of the two operations, whether by the same system or different systems, can be substantially concurrently. In some examples, two operations can execute substantially concurrently when they have the same start time, same end time, or both.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 3:
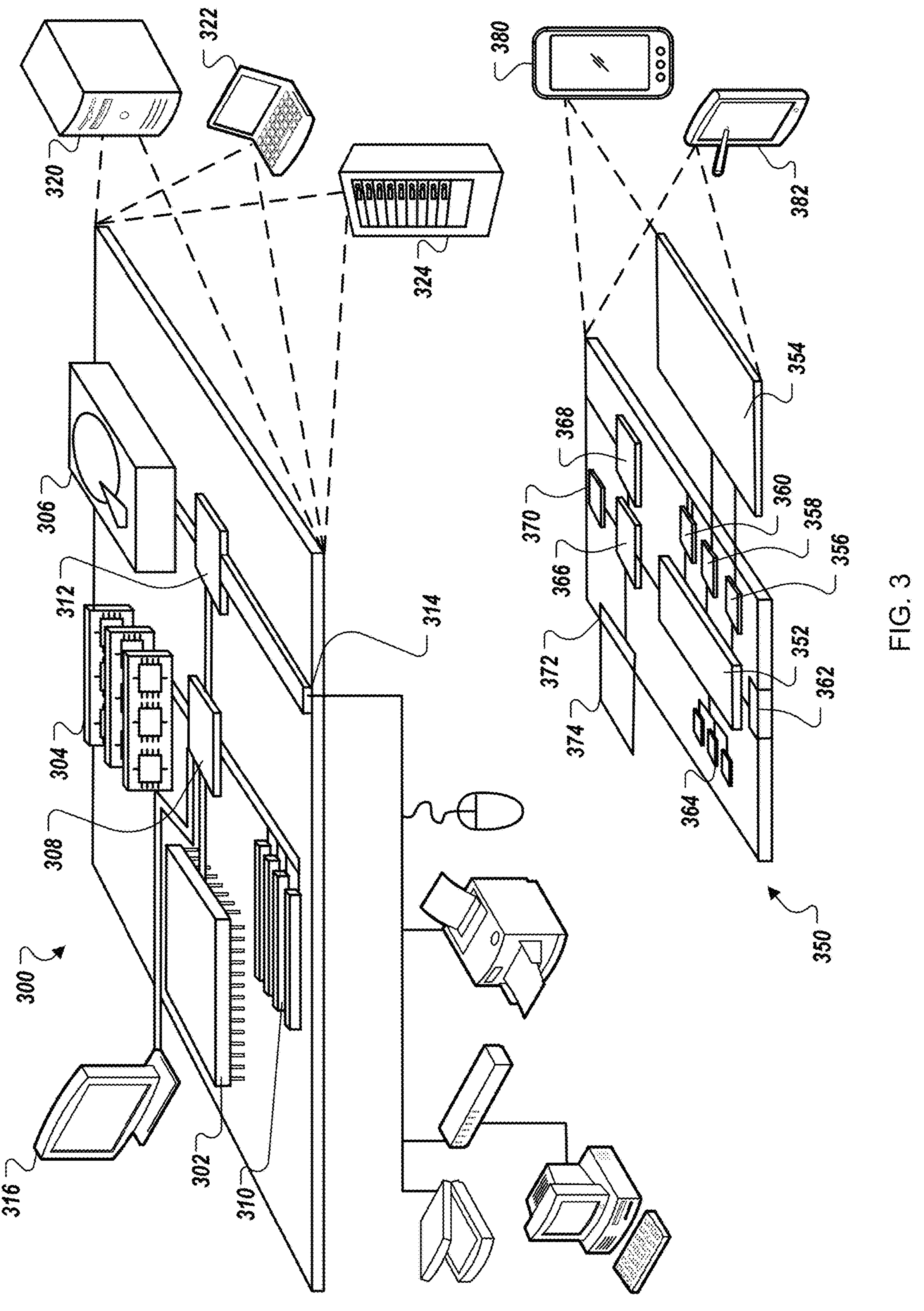
FIG. 3 is a block diagram of a computing system that can be used in connection with computer-implemented methods described in this specification.

FIG. 3 is a block diagram of computing devices 300, 350 that may be used to implement the systems and methods described in this specification, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 300 includes a processor 302, memory 304, a storage device 306, a high-speed interface 308 connecting to memory 304 and high-speed expansion ports 310, and a low-speed interface 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380, e.g., a smartphone. In some instances, the computing device 350 may be implemented as a tablet 382. Other types of the computing device 350 can include an extended reality device, e.g., an augmented reality device or a virtual reality device, a personal digital assistant, or another similar mobile device.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In some implementations, when a device or system transmits data to another device or system, the transmission of the data, such as a message, can cause the other device or system to perform one or more actions. For instance, transmission of a message that includes an instruction to a camera can cause the camera to capture one or more images, transmit one or more images to the device or system, or a combination of both.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. A system comprising one or more computers and one or more storage devices on which are stored instructions that are operable, when executed by the one or more computers, to cause the one or more computers to perform operations comprising:

computing a preferred region for true query answers for a kernel differentially private mechanism using a noise value for a query for the kernel differentially private mechanism, a true query answer for a query for the kernel differentially private mechanism, and a relative error ratio for the preferred region;

computing, for the kernel differentially private mechanism, a privacy parameter and a boosting rate that increases variance in outputs for the kernel differentially private mechanism using the preferred region for true query answers for the kernel differentially private mechanism;

maintaining a plurality of output data received from one or more client devices;

receiving, from a downstream system, a query for data from a dataset;

generating a response to the query that includes noise data using the kernel differentially private mechanism that includes the privacy parameter; and transmitting, to the downstream system, the response to the query.

2. The system of claim 1, the operations comprising:

computing a probability that output from the kernel differentially private mechanism falls in the preferred region using, as input to a cumulative density function, an offset that increases a first likelihood that the preferred region remains valid given the dataset for query answers for the kernel differentially private mechanism; and computing the boosting rate using the probability and a confidence level indicating a second likelihood that the output from the kernel differentially private mechanism falls within the preferred region.

3. The system of claim 2, wherein computing the probability comprises computing the probability using a combination of a first output of the cumulative density function with a first sign of the offset as input and a second output of the cumulative density function with a second, different sign of the offset as input.

4. The system of claim 2, wherein computing the privacy parameter comprises:

computing at least one loss using the boosting rate and, as input to a cumulative density function, the offset, and a sensitivity of the query;

computing at least one weight using, as input to a cumulative density function, the offset, a sensitivity of the query; and computing the privacy parameter using the at least one loss and the at least one weight.

5. The system of claim 1, the operations comprising:

computing a probability that output from the kernel differentially private mechanism falls in the preferred region using the true query answer, the relative error ratio, and an offset that increases a first likelihood that the preferred region remains valid given a dataset for query answers for the kernel differentially private mechanism; and computing the boosting rate using the probability and a confidence level indicating a second likelihood that the output from the kernel differentially private mechanism falls within the preferred region.

6. The system of claim 5, wherein computing the probability comprises computing the probability using, as input to a cumulative density function, the true query answer, the relative error ratio, and the offset that increases the first likelihood that the preferred region remains valid given the dataset for query answers for the kernel differentially private mechanism.

7. The system of claim 1, wherein computing the preferred region uses the true query answer for a query for the kernel differentially private mechanism, the relative error ratio for the preferred region, and an offset that increases a likelihood that the preferred region remains valid given a dataset for query answers for the kernel differentially private mechanism.

8. The system of claim 7, comprising computing the offset using a dataset that includes the preferred region and the true query answer to increase a likelihood that the preferred region remains valid for true query answers to queries.

9. One or more computer storage media encoded with instructions that, when executed by one or more computers, cause the one or more computers to perform operations comprising:

computing a preferred region for true query answers for a kernel differentially private mechanism using a noise value for a query for the kernel differentially private mechanism, a true query answer for a query for the kernel differentially private mechanism, and a relative error ratio for the preferred region;

computing, for the kernel differentially private mechanism, a privacy parameter and a boosting rate that increases variance in outputs for the kernel differentially private mechanism using the preferred region for true query answers for the kernel differentially private mechanism;

maintaining a plurality of output data received from one or more client devices;

receiving, from a downstream system, a query for data from a dataset;

generating a response to the query that includes noise data using the kernel differentially private mechanism that includes the privacy parameter; and transmitting, to the downstream system, the response to the query.

10. The computer storage media of claim 9, the operations comprising:

computing a probability that output from the kernel differentially private mechanism falls in the preferred region using, as input to a cumulative density function, an offset that increases a first likelihood that the preferred region remains valid given the dataset for query answers for the kernel differentially private mechanism; and computing the boosting rate using the probability and a confidence level indicating a second likelihood that the output from the kernel differentially private mechanism falls within the preferred region.

11. The computer storage media of claim 10, wherein computing the probability comprises computing the probability using a combination of a first output of the cumulative density function with a first sign of the offset as input and a second output of the cumulative density function with a second, different sign of the offset as input.

12. The computer storage media of claim 10, wherein computing the privacy parameter comprises:

computing at least one loss using the boosting rate and, as input to a cumulative density function, the offset, and a sensitivity of the query;

computing at least one weight using, as input to a cumulative density function, the offset, a sensitivity of the query; and computing the privacy parameter using the at least one loss and the at least one weight.

13. The computer storage media of claim 9, the operations comprising:

computing a probability that output from the kernel differentially private mechanism falls in the preferred region using the true query answer, the relative error ratio, and an offset that increases a first likelihood that the preferred region remains valid given a dataset for query answers for the kernel differentially private mechanism; and computing the boosting rate using the probability and a confidence level indicating a second likelihood that the output from the kernel differentially private mechanism falls within the preferred region.

14. The computer storage media of claim 13, wherein computing the probability comprises computing the probability using, as input to a cumulative density function, the true query answer, the relative error ratio, and the offset that increases the first likelihood that the preferred region remains valid given the dataset for query answers for the kernel differentially private mechanism.

15. The computer storage media of claim 9, wherein computing the preferred region uses the true query answer for a query for the kernel differentially private mechanism, the relative error ratio for the preferred region, and an offset that increases a likelihood that the preferred region remains valid given a dataset for query answers for the kernel differentially private mechanism.

16. The computer storage media of claim 15, comprising computing the offset using a dataset that includes the preferred region and the true query answer to increase a likelihood that the preferred region remains valid for true query answers to queries.

17. A computer-implemented method comprising:

computing a preferred region for true query answers for a kernel differentially private mechanism using a noise value for a query for the kernel differentially private mechanism, a true query answer for a query for the kernel differentially private mechanism, and a relative error ratio for the preferred region;

computing, for the kernel differentially private mechanism, a privacy parameter and a boosting rate that increases variance in outputs for the kernel differentially private mechanism using the preferred region for true query answers for the kernel differentially private mechanism;

maintaining a plurality of output data received from one or more client devices;

receiving, from a downstream system, a query for data from a dataset;

generating a response to the query that includes noise data using the kernel differentially private mechanism that includes the privacy parameter; and transmitting, to the downstream system, the response to the query.

18. The method of claim 17, comprising:

computing a probability that output from the kernel differentially private mechanism falls in the preferred region using, as input to a cumulative density function, an offset that increases a first likelihood that the preferred region remains valid given the dataset for query answers for the kernel differentially private mechanism; and computing the boosting rate using the probability and a confidence level indicating a second likelihood that the output from the kernel differentially private mechanism falls within the preferred region.

19. The method of claim 18, wherein computing the probability comprises computing the probability using a combination of a first output of the cumulative density function with a first sign of the offset as input and a second output of the cumulative density function with a second, different sign of the offset as input.

20. The method of claim 18, wherein computing the privacy parameter comprises:

computing at least one loss using the boosting rate and, as input to a cumulative density function, the offset, and a sensitivity of the query;

computing at least one weight using, as input to a cumulative density function, the offset, a sensitivity of the query; and computing the privacy parameter using the at least one loss and the at least one weight.

* * * * *